S. P. M. TASKER.
Furnaces for Heating Metallic Bars, Tubes, &c.

No. 135,674. Patented Feb. 11, 1873.

WITNESSES
Thomas J. Bewley.
Isaac Rindge

INVENTOR
Stephen P. M. Tasker
By His Attorney
Stephen Ustick

UNITED STATES PATENT OFFICE.

STEPHEN P. M. TASKER, OF PHILADELPHIA, PENNSYLVANIA.

IMPROVEMENT IN FURNACES FOR HEATING METALLIC BARS, TUBES, &c.

Specification forming part of Letters Patent No. 135,674, dated February 11, 1873.

*To all whom it may concern:*

Be it known that I, STEPHEN P. M. TASKER, of the city of Philadelphia and State of Pennsylvania, have invented certain Improvements in Metallurgical Furnaces, of which the following is a specification:

My invention relates to a furnace for heating metallic bars, rods, or tubes. It has two or more heating-chambers, which have an uninterrupted communication between them, formed by longitudinal downward projections of an arch, which is sprung over the said heating-chamber, and is supported by the outer walls of the furnace alone, as hereinafter fully described.

These heating-chambers have one continuous level hearth throughout their whole extent, to provide for the removal of the bars, &c., from one chamber to the other by lateral movement, so that after being heated in one chamber they may be removed to the other to be kept in their heated state, to be drawn therefrom at pleasure, endwise, to be worked, thus admitting of a continuous addition of the bars, &c., with the heating-chamber, so as to have always on hand a supply of heated bars, &c., ready to be worked.

Figure 1:
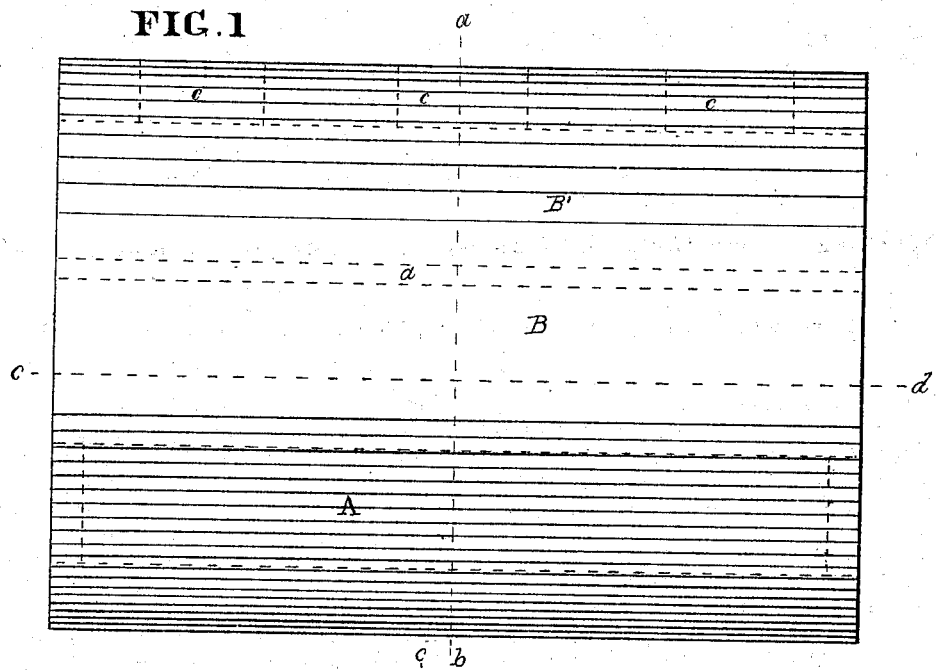
Figure 2:
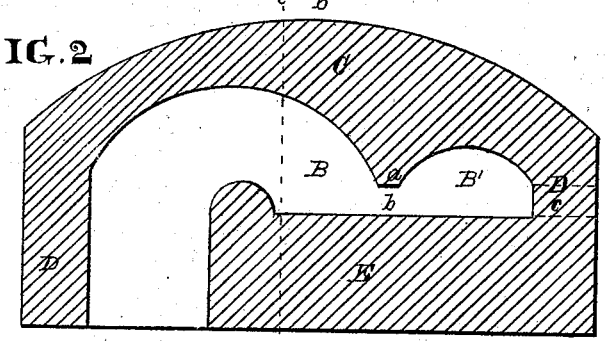
Figure 3:
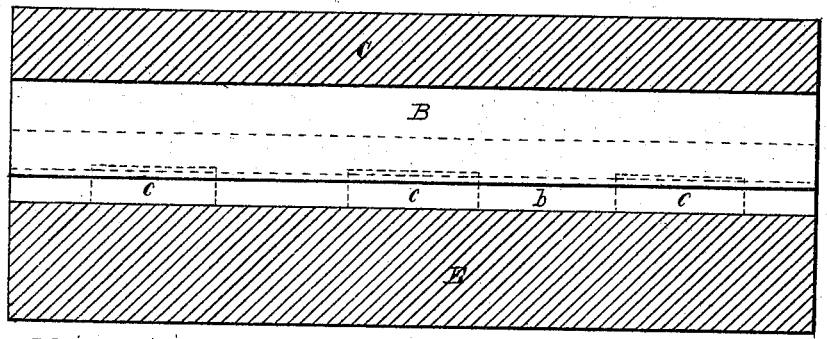

Figure 1 is a plan view of the improved furnace. Fig. 2 is a cross-section on the line $a\ b$ of Fig. 1. Fig. 3 is a longitudinal section at the line $c\ d$ of Figs. 1 and 2.

Like letters in all the figures indicate the same parts.

A is the fire-flue. B is a heating-chamber, which has an open communication with the fire-flue. B' is a second heating-chamber—a free communication from end to end with the chamber B, the said communication being formed by the form of the inner surface of the arch C, as seen in Fig. 3, the said arch being wholly supported by the walls D D of the furnace. The heating-chambers B and B', as seen in Fig. 3, are separated from each other by the downward projection $a$ of the arch C, there being, however, an open space, $b$, of sufficient height from the hearth E to admit of the material in one of the chambers being removed to the other at pleasure.

It will be seen that any desired number of heating-chambers may be constructed and arranged in the same manner as the chambers B B'. $c\ c\ c$ are flues leading to the chimney.

I have only described the general construction of the furnace without showing any of the details which are not intimately connected with my invention.

I do not confine myself to the precise form or construction as shown in the drawing; but

What I claim as my invention is—

The arch C, having one or more downward projections, $a$, which separate the heating-chambers, there being an open space beneath each projection communicating with the chamber to admit of the material of one chamber being removed to the other without removing it from the hearth, substantially as described.

STEPHEN P. M. TASKER.

Witnesses:
 THOMAS J. BEWLEY,
 STEPHEN USTICK.